United States Patent
Wangercyn et al.

(10) Patent No.: US 11,569,861 B2
(45) Date of Patent: Jan. 31, 2023

(54) CASE WITH SECONDARY WELL AND ANNULAR RIDGE ABOUT APERTURES

(71) Applicants: John Thomas Wangercyn, Schererville, IN (US); James Ryan Wangercyn, Schererville, IN (US); Joseph Michael Wangercyn, Schererville, IN (US)

(72) Inventors: John Thomas Wangercyn, Schererville, IN (US); James Ryan Wangercyn, Schererville, IN (US); Joseph Michael Wangercyn, Schererville, IN (US)

(*) Notice: Subject to any disclaimer, the term of this patent is extended or adjusted under 35 U.S.C. 154(b) by 0 days.

(21) Appl. No.: 17/090,570

(22) Filed: Nov. 5, 2020

(65) Prior Publication Data

US 2021/0143858 A1 May 13, 2021

Related U.S. Application Data

(60) Provisional application No. 62/931,976, filed on Nov. 7, 2019.

(51) Int. Cl.
| | | |
|---|---|---|
| *H04B 1/3888* | (2015.01) | |
| *A45C 11/00* | (2006.01) | |
| *H04B 1/3877* | (2015.01) | |
| *H04M 1/725* | (2021.01) | |

(52) U.S. Cl.
CPC ............ *H04B 1/3888* (2013.01); *A45C 11/00* (2013.01); *H04B 1/3877* (2013.01); *H04M 1/725* (2013.01); *A45C 2011/002* (2013.01)

(58) Field of Classification Search
CPC ..... H04B 1/3888; H04B 1/3877; A45C 11/00; A45C 2011/002; H04M 1/725
See application file for complete search history.

(56) References Cited

U.S. PATENT DOCUMENTS

| | | | | |
|---|---|---|---|---|
| 2,416,080 | A * | 2/1947 | Bailey | H01P 7/04 455/325 |
| 5,271,080 | A * | 12/1993 | Hopper | G02B 6/4248 385/139 |
| 6,499,379 | B1 * | 12/2002 | Louzon | F16H 37/043 74/606 R |
| 7,780,047 | B2 * | 8/2010 | Chen | H05K 5/023 224/675 |
| D647,085 | S * | 10/2011 | Chung | A45C 13/26 D14/250 |
| 8,428,664 | B1 * | 4/2013 | Wyers | F16M 13/04 455/575.1 |

(Continued)

*Primary Examiner* — Lewis G West
(74) *Attorney, Agent, or Firm* — Wood, Phillips, Katz, Clark & Mortimer

(57) ABSTRACT

The disclosure includes a case of a portable electronic device such as a cell phone, the case including a first well for receiving the portable electronic device and a secondary well. The case may include a thin layer of material on the exterior surface of the back wall of the case. The back wall of the case may include an aperture for receiving a portion of a silicone strip or finger loop, the aperture registering with an aperture in the thin layer of material. The aperture in the back wall of the case may include a flange or annular ridge on the exterior surface of the back wall, the flange or annular ridge preferably being level with the exterior surface of the thin layer of material.

15 Claims, 4 Drawing Sheets

(56) References Cited

U.S. PATENT DOCUMENTS

| | | | | |
|---|---|---|---|---|
| 8,442,604 B1* | 5/2013 | Diebel | G03B 17/02 | 455/575.8 |
| 8,550,317 B2* | 10/2013 | Hyseni | A45F 5/00 | 224/217 |
| 8,573,395 B1* | 11/2013 | Dafni | A45C 15/04 | 206/320 |
| 8,746,448 B1* | 6/2014 | Bellace | A45F 5/00 | 224/217 |
| RE45,179 E* | 10/2014 | Bodkin | A45F 5/02 | 190/125 |
| 8,950,638 B2* | 2/2015 | Wangercyn, Jr. | A45F 5/00 | 224/217 |
| 9,155,377 B2* | 10/2015 | Wangercyn, Jr. | A45C 11/00 | |
| 9,383,545 B2* | 7/2016 | Xu | G02B 7/026 | |
| 9,407,743 B1* | 8/2016 | Hirshberg | H04B 1/385 | |
| D777,162 S* | 1/2017 | Erickson-Davis | D14/250 | |
| 9,793,941 B1* | 10/2017 | Hirsch | G06F 1/1656 | |
| 10,117,505 B1* | 11/2018 | Alvarez | A45F 5/00 | |
| 10,299,553 B1* | 5/2019 | Hoover | H04B 1/3888 | |
| D863,287 S* | 10/2019 | Srour | D14/251 | |
| 10,463,126 B2* | 11/2019 | Mallory | A45C 11/00 | |
| D905,040 S* | 12/2020 | Altschul | H04B 1/3888 | D14/251 |
| 10,863,013 B2* | 12/2020 | Wilder | H04M 1/185 | |
| 10,982,386 B2* | 4/2021 | Walters, Jr. | D06P 5/2072 | |
| D929,382 S* | 8/2021 | Gwyn | D14/251 | |
| 2009/0090750 A1* | 4/2009 | Alcenat | A45F 5/00 | 224/101 |
| 2010/0014232 A1* | 1/2010 | Nishimura | H05K 5/0017 | 65/102 |
| 2011/0266313 A1* | 11/2011 | Ghalib | A45F 5/00 | 224/101 |
| 2011/0309117 A1* | 12/2011 | Roberts | H04M 1/04 | 224/217 |
| 2012/0048873 A1* | 3/2012 | Hyseni | A45F 5/00 | 220/752 |
| 2013/0146625 A1* | 6/2013 | Karle | A44C 9/0061 | 224/217 |
| 2014/0054910 A1* | 2/2014 | Kim | H04B 1/3888 | 294/158 |
| 2014/0061087 A1* | 3/2014 | Mao | B65D 25/34 | 206/521 |
| 2014/0084034 A1* | 3/2014 | Wangercyn, Jr. | A45F 5/00 | 224/217 |
| 2014/0166706 A1* | 6/2014 | Leisey-Bartsch | A45F 5/00 | 224/197 |
| 2014/0316426 A1* | 10/2014 | Gollner | F16L 37/0985 | 606/108 |
| 2015/0065206 A1* | 3/2015 | Rojas | G06F 1/1628 | 455/575.1 |
| 2015/0133202 A1* | 5/2015 | Fife | H04M 1/11 | 455/575.8 |
| 2015/0141090 A1* | 5/2015 | Hwan | H04B 1/3888 | 455/575.8 |
| 2016/0066454 A1* | 3/2016 | Hill | H04M 1/0202 | 156/60 |
| 2016/0134733 A1* | 5/2016 | Murphy | A45F 5/00 | 455/575.6 |
| 2018/0185025 A1* | 7/2018 | Gorek | A61B 46/00 | |
| 2018/0199686 A1* | 7/2018 | Wang | A45C 13/001 | |
| 2018/0254791 A1* | 9/2018 | Lin | A45C 11/00 | |
| 2018/0271263 A1* | 9/2018 | Lin | A45F 5/00 | |
| 2018/0289122 A1* | 10/2018 | Lin | A45C 13/36 | |
| 2019/0314105 A1* | 10/2019 | Zwierstra | A61B 50/30 | |
| 2020/0098498 A1* | 3/2020 | Mora | B60R 11/02 | |
| 2021/0059370 A1* | 3/2021 | Del Toro | F16M 11/10 | |
| 2021/0059371 A1* | 3/2021 | Balmer | A45C 11/00 | |
| 2021/0143858 A1* | 5/2021 | Wangercyn | H04B 1/3888 | |
| 2022/0080633 A1* | 3/2022 | Lan | B29C 45/14336 | |
| 2022/0233397 A1* | 7/2022 | Huang | H02K 33/00 | |
| 2022/0248834 A1* | 8/2022 | Soto | H04B 1/3888 | |

* cited by examiner

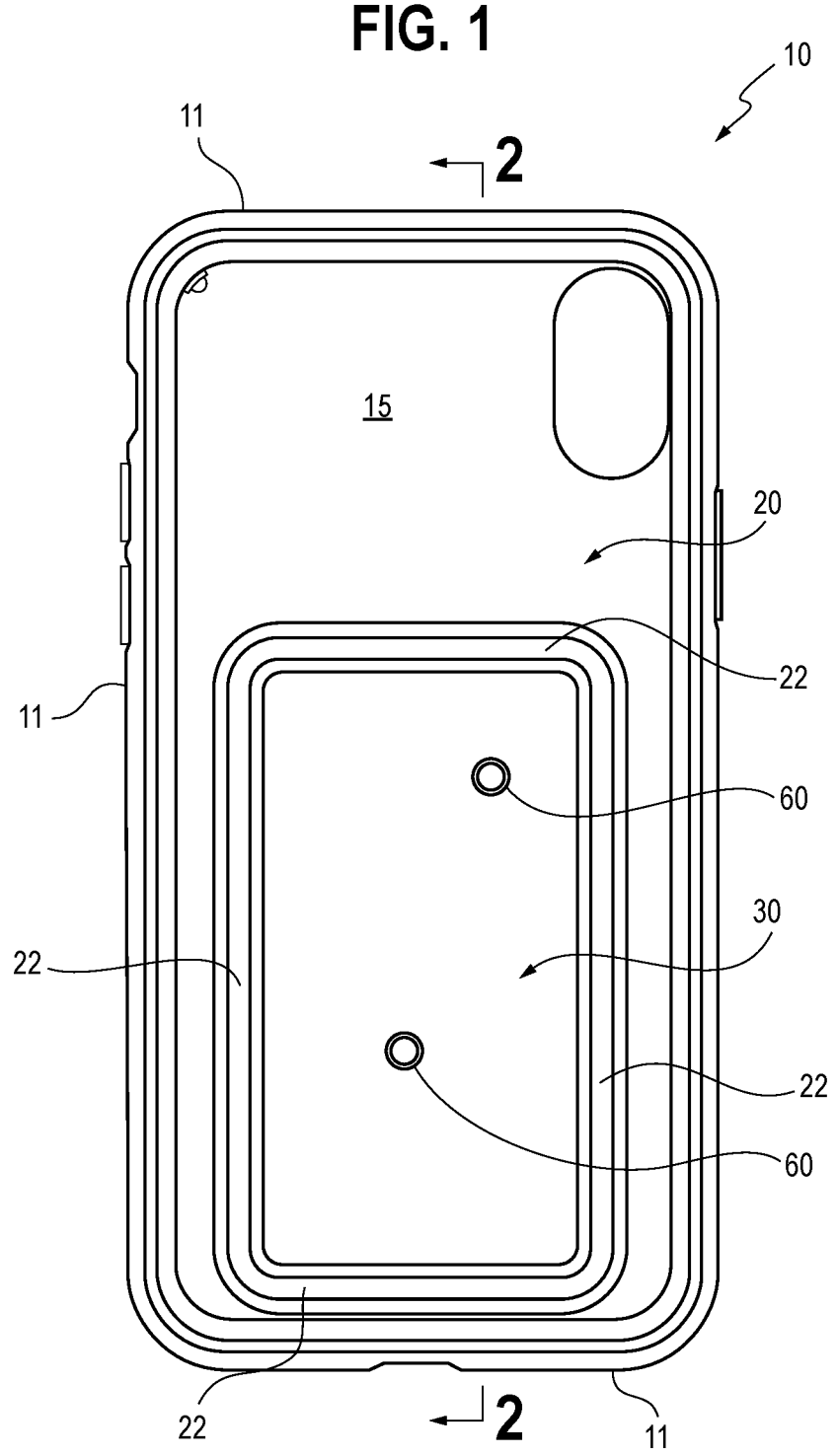

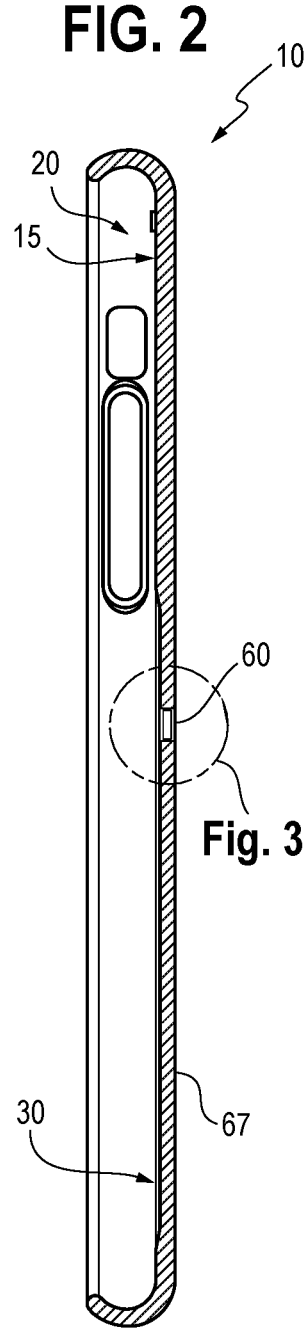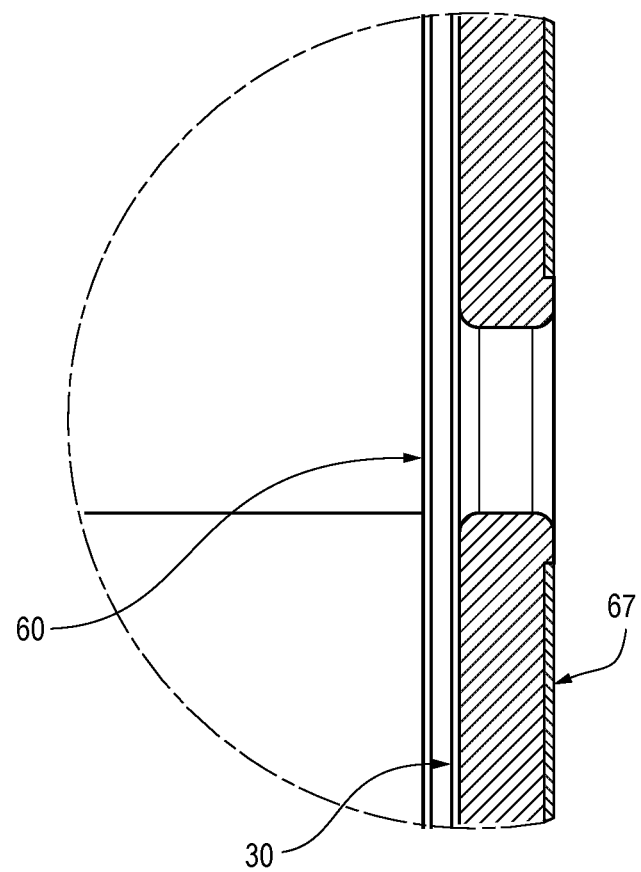

CASE WITH SECONDARY WELL AND ANNULAR RIDGE ABOUT APERTURES

BACKGROUND OF THE INVENTION

Field of the Invention

Disclosed herein is an improved case or cover for a portable electronic device such as a cell phone.

Background Art

Cell phone cases or covers are well known and one skilled in the art understands and recognizes the many ways they may be constructed. In general, such cases and covers include a well or other area to receive the cell phone or other portable electronic device, the well defined by the walls or panels of the case or cover. Of particular interest for the present invention are cases that may include a finger loop or other device that protrudes through the wall of the case. An example of such a case and finger loop is disclosed in U.S. Pat. No. 8,950,638, whose disclosure is incorporated herein.

SUMMARY OF THE INVENTION

The invention disclosed herein includes a case wall having an aperture to accept a finger loop, typically made of silicone. The case may include a thin layer of material adhered to or otherwise secured to the outer surface of the panel or wall having the aperture, the thin layer of material typically forming or carrying an exterior decorative element. The thin layer of material may be made of a harder material than the finger loop. If the finger loop rubs against the edge of the thin layer of material that is about the aperture, the finger loop may be cut or otherwise worn and be at risk of breaking.

Disclosed herein is a case back or wall that includes a flange, ridge, or other structure about the aperture to prevent contact between the finger loop or other device in the aperture and the edge of the thin layer of material.

In one form, the invention is directed to a case for a portable electronic device. The case includes a well for receiving the portable electronic device. The case further includes a back wall that has an aperture. The aperture includes an annular ridge that extends above the back of the case and extends radially outward about the aperture.

In one form, the case further includes a thin layer of material on the back of the case. The thin layer of material has an aperture positioned about the annular ridge.

In one form, the surface of the thin layer of material is even with the top surface of the flange.

In one form, a silicone strip is secured in the aperture of the case.

In one form, the silicone strip includes a portion in the secondary well.

In one form, the case further includes a second aperture. The first and second apertures are aligned at an angle of 15 degrees to a side of the case.

In one form, the invention is directed to a case for holding a portable electronic device. The case includes a back wall with an exterior surface. A thin layer of material is secured to the back wall. The back wall includes a first aperture. The thin layer of material includes a second aperture. The second aperture has a diameter greater than the first aperture and is in registration with the first aperture. The back wall further includes a flange about the first aperture.

In one form, the flange has a top surface that is even with an outer surface of the thin layer of material.

In one form, a silicone strip is in the aperture.

In one form, the back wall includes a third aperture. The thin layer of material has a fourth aperture. The third and fourth apertures are in registration with each other.

In one form, a finger loop is placed in the aperture.

In one form, the flange includes a top surface that extends above the outer surface of the thin layer of material.

In one form, the flange includes a radially extending portion displaced from the back surface of the case.

In one form, the radially extending portion of the flange is displaced from the back surface of the back wall of the case by a distance equal to the thickness of the thin layer of material.

BRIEF DESCRIPTION OF THE DRAWINGS

FIG. 1 is a front view of the case of the present invention, showing two offset apertures in the back wall. The figure also shows a first main well for receiving a portable electronic device, and a second well, the apertures being in the second well.

FIG. 2 is a cross-sectional view of FIG. 1, the cross-section intersecting one of the apertures in the back wall of the case.

FIG. 3 is a close-up of the sectional view of FIG. 2. The close up shows the detail of the annular flange or ridge around the aperture. It is noted that this figure does not show the thin layer of PET. One skilled in the art will recognize that the thin layer, when present, is meant to be at the same level or below the annular ridge where it meets the annular ridge.

DETAILED DESCRIPTION OF THE PREFERRED EMBODIMENT

Figure 4:
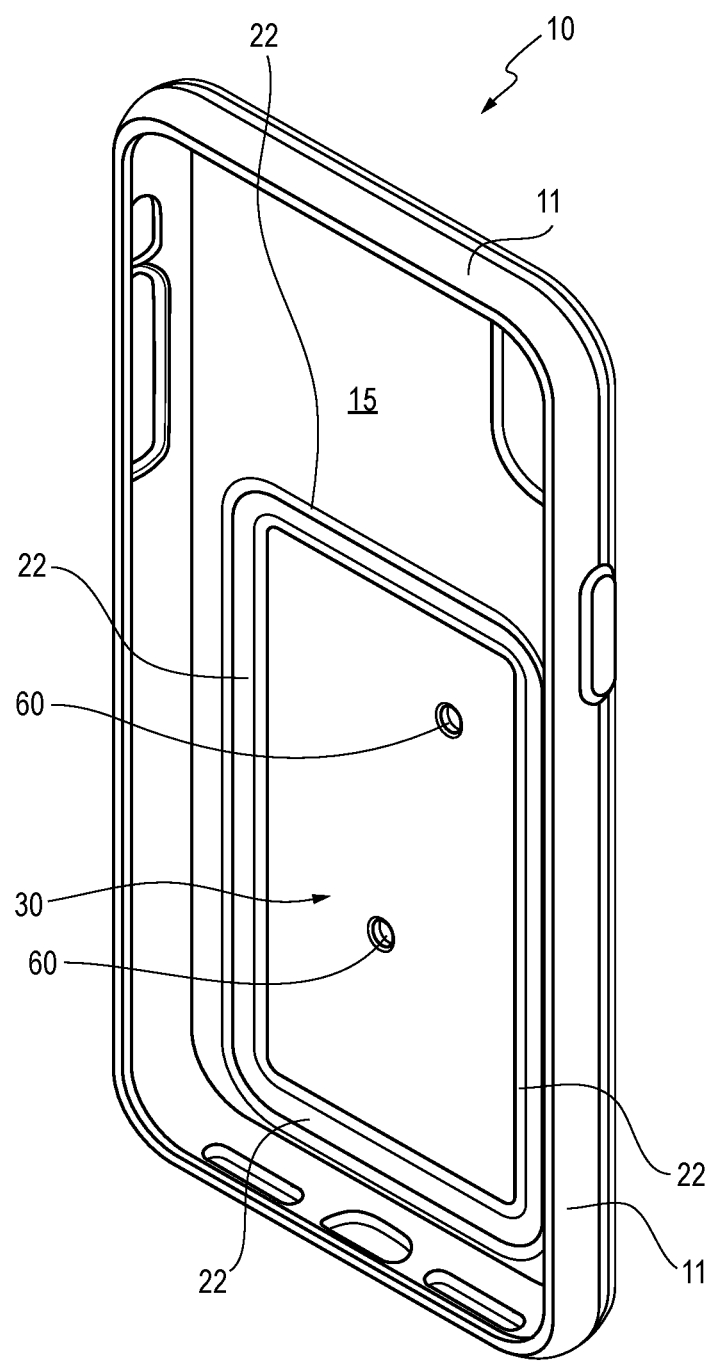
FIG. 4 is a perspective view of the case.
Figure 5:
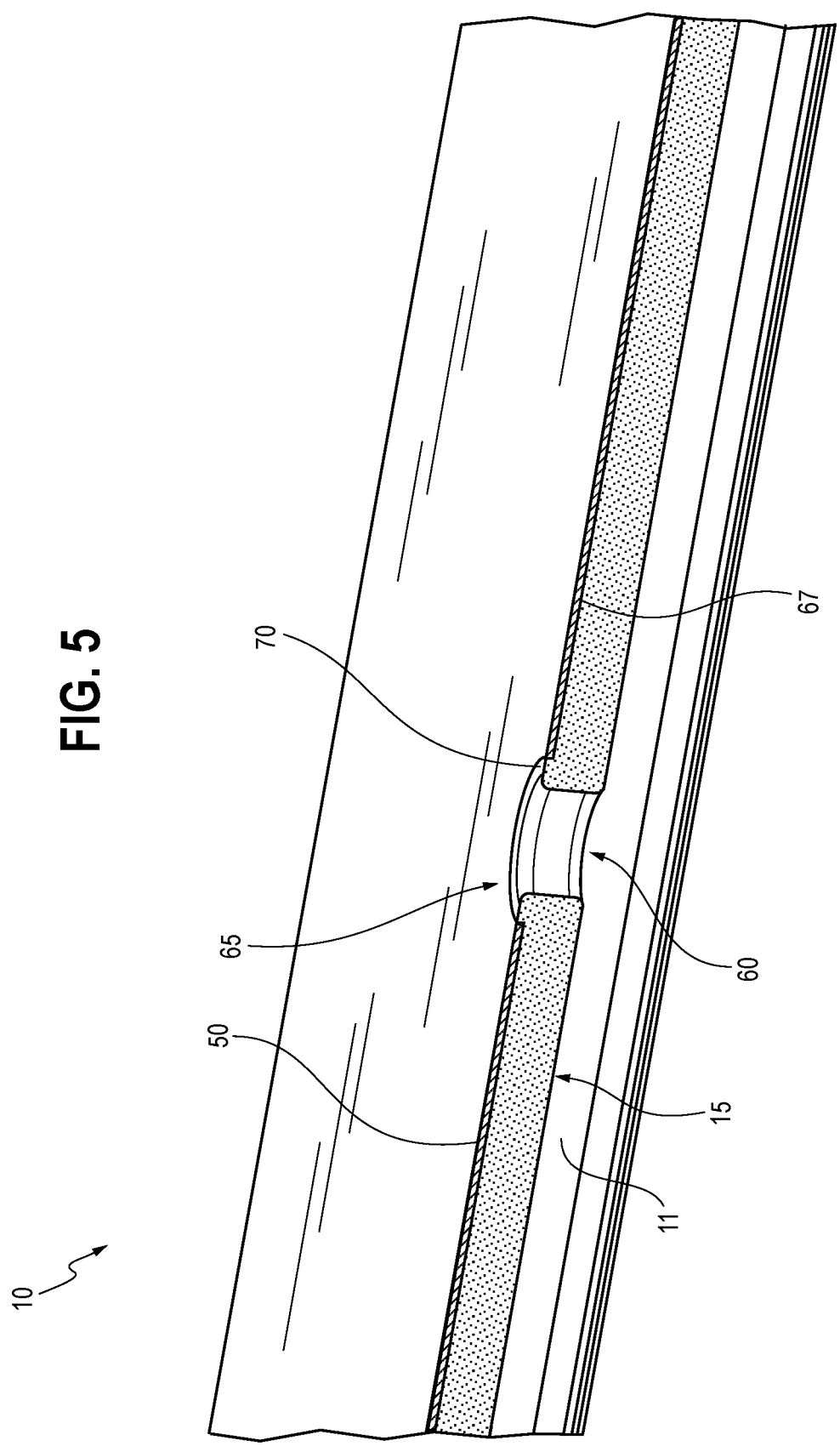
FIG. 5 is a portion of a cross section of the case, showing the thin layer and the annular ridge about the aperture.

The case 10 includes a plurality of side walls 11 extending from a back wall 15, defining a well 20 or area for receiving a portable electronic device. The walls 11 and back wall 15 of the case are preferably made of TPU or other soft plastic material known to one skilled in the art.

The back wall 15 of the case 10 may include an area that is depressed from the inner surface of the back wall 15. This depression creates a secondary well 30, or cavity. This secondary well 30 or cavity forms a chamber when the portable electronic device is placed in the case 10, the chamber being defined by the walls 22 forming the secondary well 30, and the back of the portable electronic device that is in the first well 20.

The case 10 may include a thin layer of material 50 on the outer surfaces of the case. In the most preferred embodiment, the thin layer of material 50 is a PET Polyethylene Terephthalate or polycarbonate material and covers at least a portion of the outer surface of the back 15 of the case 10. Other thin materials may be used such as plastics, polymers, or metals. Renewable materials such as wood may also be used.

In another embodiment, the thin layer 50 includes decoration, indicia, or other graphic elements to display.

In some embodiments, the case back 15 may include an aperture 60 or a plurality of apertures allowing communication between the well 20 of the case or secondary well 30 of the case 10 and an area outside of the back of the case 10.

In some embodiments, the apertures 60 are used to secure retention structures, such as strips of silicone to aid in the holding of the case 10 and device. Such retention structures or finger loops are known in the art and disclosed in U.S. Pat. No. 8,950,638 whose disclosure in incorporated herein. The thin layer 50 may include apertures 65 as well, at least some of the thin layer apertures 65 being in registration with the back wall apertures 60. The thin layer apertures 65 may be of a larger diameter when compared to the corresponding or registered back wall apertures 60.

The silicone strip, finger loop, or other device placed through the aperture 60 may include a portion on either side of the back wall. As such, a portion of the silicone strip, finger loop, or other device may be in the secondary well 30 of the case 10. The strip, finger loop, or other device may be made out of materials other than silicone, such as leather, fiber, cloth, wire, plastics, or other materials that can be flexed.

In the most preferred embodiment, the material of the case back surrounding at least one of the apertures 60 extends above the back surface 67 of the back wall 15 of the case 10 to be level with or above the thin layer of material 50 surrounding the aperture 60. Thus the case back material forms an annular ridge 70, flange, or base around the aperture 60. This construction prevents the thin layer of material 50 from wearing or cutting into any material placed in the aperture 60, such as a strip of silicone that may be threaded thru the aperture 60 for purposes of forming a grip or user retention feature.

The annular ridge 70, flange, or base around the aperture 60 may be used as a registration structure, particularly if there is more than one aperture 60 and annular ridge 70. The annular ridge 70 may also act as a retention structure to retain the thin layer 50 on the back surface 67 of the back wall 15 of the case 10. In some embodiments, the annular ridge 70 may include a flange extending radially outward at its top surface, the flange displaced from the back of the case 67 a distance that is approximately equal to the thickness of the thin layer of material 50. The flange may thus further secure the thin layer 50 to the back of the case 10. In some embodiments, the annular ridge 70 may extend above the outer surface of the thin layer of material 50 even if the radially extending flange at the top surface is not present.

One skilled in the art should also recognize that the annular ridge 70, flange, or base need not be circular. The ridge, flange, or base may be of any cross section or shape. In such embodiments, the thin layer aperture 65 may be of a corresponding cross section or shape such that the ridge, flange, or base fits through the thin layer aperture 65. Similarly, the ridge 70, the ridge flange or base may extend above the back surface of the thin layer of material 50 and include a radial flange that is displaced from the back surface 67 of the case 10 at the top surface of the ridge, flange, or base to capture the thin layer of material between the radial flange and the back surface 67 of the case 10.

In some embodiments of the invention, there may be two apertures 60. The apertures may be positioned at an angle of approximately 10 to 30 degrees from the side wall of the case.

The foregoing disclosure of specific embodiments is intended to be illustrative of the broad concepts comprehended by the invention.

The invention claimed is:

1. A case for holding a portable electronic device, the case including a back wall, the back wall having an exterior surface, a thin layer of material secured to the back wall, the back wall including a first aperture, the thin layer of material including a second aperture, the second aperture having a diameter greater than the first aperture and being in registration with the first aperture, the back wall further including a flange about the first aperture.

2. The case of claim 1, wherein the flange has a top surface that is even with an outer surface of the thin layer of material.

3. The case of claim 2, wherein a silicone strip is in the first aperture.

4. The case of claim 2, wherein a finger loop is placed in the aperture.

5. The case of claim 2 wherein the flange includes a top surface that extends above the outer surface of the thin layer of material.

6. The case of claim 5, wherein the flange includes a radially extending portion displaced from the back surface of the case.

7. The case of claim 6, wherein the radially extending portion of the flange is displaced from the back surface of the back wall of the case by a distance equal to the thickness of the thin layer of material.

8. The case of claim 1 wherein the back wall includes a third aperture and the thin layer of material has a fourth aperture, the third and fourth aperture being in registration with each other.

9. A case for holding a portable electronic device, the case including a back wall, the back wall having an exterior surface and an interior surface, a thin layer of material secured to at least a portion of the exterior surface of the back wall, the back wall including a first aperture, the thin layer of material including a second aperture, the second aperture having a diameter greater than the first aperture and being in registration with the first aperture, the exterior surface of the back wall further including an annular ridge about the first aperture.

10. The case of claim 9 wherein the annular ridge has an exterior surface that is even with an exterior surface of the thin layer of material.

11. The case of claim 10 wherein a silicone strip is in the first aperture.

12. The case of claim 9 wherein the first aperture is of constant diameter from the back wall exterior surface to the back wall interior surface.

13. The case of claim 9, wherein the back wall includes a third aperture and the thin layer of material has a fourth aperture, the third and fourth aperture being in registration with each other.

14. The case of claim 9 wherein the annular ridge includes an exterior surface that is not even with the exterior surface of the thin layer of material.

15. The case of claim 9 wherein the annular ridge includes a portion that radially extends from the first aperture, the portion being displaced from the exterior surface of the back of the case.

* * * * *